(12) United States Patent
Henderson et al.

(10) Patent No.: US 7,877,988 B2
(45) Date of Patent: Feb. 1, 2011

(54) APPARATUS, SYSTEM, AND METHOD FOR CONTROLLING SOOT FILTER REGENERATION USING MAXIMUM SOOT FILTER TEMPERATURE

(75) Inventors: Gregory H. Henderson, Columbus, IN (US); Peter Rauznitz, Columbus, IN (US); Greg Emerick, Columbus, IN (US); Joseph M. Brault, Columbus, IN (US)

(73) Assignee: Cummins IP, Inc., Minneapolis, MN (US)

( * ) Notice: Subject to any disclaimer, the term of this patent is extended or adjusted under 35 U.S.C. 154(b) by 126 days.

(21) Appl. No.: 11/968,579

(22) Filed: Jan. 2, 2008

(65) Prior Publication Data
US 2008/0155965 A1 Jul. 3, 2008

Related U.S. Application Data

(60) Provisional application No. 60/883,158, filed on Jan. 2, 2007.

(51) Int. Cl.
*F01N 3/00* (2006.01)
(52) U.S. Cl. .............................. 60/295; 60/274; 60/286; 60/297; 60/311
(58) Field of Classification Search .................. 60/274, 60/276, 295, 297, 311, 286
See application file for complete search history.

(56) References Cited

U.S. PATENT DOCUMENTS

| | | | |
|---|---|---|---|
| 4,914,065 A | 4/1990 | Hijikata et al. | |
| 6,729,128 B2 | 5/2004 | Shiratani et al. | |
| 6,829,890 B2 | 12/2004 | Gui et al. | 60/295 |
| 6,862,927 B2 | 3/2005 | Craig et al. | 73/118.1 |
| 6,901,751 B2 | 6/2005 | Bunting et al. | |
| 6,978,604 B2 | 12/2005 | Wang et al. | 60/297 |
| 7,031,827 B2 | 4/2006 | Trudell et al. | |
| 7,031,877 B2 | 4/2006 | LeGore et al. | 702/181 |
| 7,322,182 B2* | 1/2008 | Ueno et al. | 60/295 |
| 7,421,838 B2* | 9/2008 | Nakano | 60/295 |
| 7,500,358 B2* | 3/2009 | Singh et al. | 60/295 |
| 2004/0237513 A1 | 12/2004 | Bunting et al. | |
| 2006/0086095 A1 | 4/2006 | Da-Silva et al. | |
| 2006/0096280 A1 | 5/2006 | Zhan et al. | 60/297 |

OTHER PUBLICATIONS

PCT Written Opinion and International Search Report, Apr. 18, 2008.
PCT/US20/08050050 International Preliminary Report on Patentability, Sep. 4, 2009.

* cited by examiner

*Primary Examiner*—Thomas E Denion
*Assistant Examiner*—Diem Tran
(74) *Attorney, Agent, or Firm*—Kunzler Needham Massey & Thorpe

(57) ABSTRACT

An apparatus, system, and method are disclosed for controlling soot filter regeneration. The apparatus includes an average temperature module configured to determine an average bed temperature, and a max temperature module configured to calculate a target maximum bed temperature based upon the average bed temperature. The system includes a vehicle having a motor, an exhaust system, an after treatment system, an after treatment controller module, and the apparatus. The method includes determining an average bed temperature, and calculating a target maximum bed temperature based upon the average bed temperature.

20 Claims, 6 Drawing Sheets

US 7,877,988 B2

APPARATUS, SYSTEM, AND METHOD FOR CONTROLLING SOOT FILTER REGENERATION USING MAXIMUM SOOT FILTER TEMPERATURE

CROSS-REFERENCES TO RELATED APPLICATIONS

This application claims priority to U.S. Provisional Patent Application No. 60/883,158 entitled "APPARATUS, SYSTEM, AND METHOD FOR CONTROLLING SOOT FILTER REGENERATION USING MAXIMUM SOOT FILTER TEMPERATURE" and filed on Jan. 2, 2007 for Gregory H. Henderson et al., which is incorporated herein by reference.

BACKGROUND OF THE INVENTION

1. Field of the Invention

This invention relates to model implementation and more particularly relates to apparatuses, systems, and methods for combining theoretical and empirical knowledge as an improvement over a purely theoretical or purely empirical model.

2. Description of the Related Art

Modern diesel emissions regulations are driving engine manufacturers to use particulate filters in engine after treatment systems. These filters accumulate soot over time, and the soot must be removed from the filter periodically.

There are two primary mechanisms for removing the soot. The engine naturally generates some $NO_2$ in the exhaust stream. At low temperatures, this $NO_2$ oxidizes some of the soot on the filter, releasing the soot—typically as CO or $CO_2$. This mechanism is called "noxidation."

The noxidation mechanism is often insufficient to keep the particulate filter at acceptable soot levels. Therefore, a faster oxidation mechanism is sometimes required. One implementation of this mechanism is to raise the temperature of the exhaust stream to the point where simple $O_2$ will oxidize the soot. This temperature is higher than where the engine will typically run under normal loads and therefore must generally be triggered intentionally by the engine controls. This mechanism is called "oxidation."

In order to raise the temperature of the exhaust in order to trigger the "burn off" event, fuel may be injected into the exhaust stream and subsequently ignited. A dosing controller monitors the temperature and raises and lowers the temperature to ensure a proper burn off.

If the soot level is too high in the particulate filter when the oxidation or burn off event is initiated, oxidation can generate heat within the particulate filter much more quickly than the rate at which the heat can be dissipated. This causes local temperature spikes within the particulate filter, and can result in unnecessary wear on the particulate filter or even mechanical failure of the particulate filter. A runaway heat spike like this is called an "uncontrolled regeneration."

In order to prevent these heat spikes, the dosing controller attempts to determine an average temperature in the particulate filter and control the exhaust such that the temperature of the exhaust remains within a range of this average temperature. However, the particulate filter often can handle temperatures much higher than the average temperature. A burn off at higher temperatures reduces the amount of time required for the burn off or oxidation event. Unfortunately, current after treatment control systems are unable to calculate or predict a target maximum temperature based upon the average temperature of the particulate filter.

From the foregoing discussion, it should be apparent that a need exists for an apparatus, system, and method that can overcome the limitations of current after treatment control systems. Beneficially, such an apparatus, system, and method would calculate a target maximum temperature based on an average particulate temperature.

SUMMARY OF THE INVENTION

The present invention has been developed in response to the present state of the art, and in particular, in response to the problems and needs in the art that have not yet been fully solved by currently available after treatment systems. Accordingly, the present invention has been developed to provide an apparatus, method and system for controlling soot filter regeneration using a target maximum temperature.

The apparatus, in one embodiment, includes an average temperature module configured to determine an average bed temperature, and a max temperature module configured to calculate a target maximum bed temperature based upon the average bed temperature. The apparatus also includes a dosing controller module in communication with an after treatment system and configured to adjust the average temperature of the bed to a range of between about ±200° F. of the target maximum bed temperature in order to initiate regeneration of the particulate filter. Alternatively, the dosing controller module in may be configured to adjust the average temperature of the bed to a range of between about ±100° F. of the target maximum bed temperature in order to initiate regeneration of the particulate filter In one embodiment, the max temperature module is configured to calculate the target maximum bed temperature according to $$T_{3,max,SF} = T_{SF,AVG} + \left[\frac{7}{80r_3} + \frac{3}{8}r_3 - \frac{1}{16}r_3^3\right](T_{e,SF,in} - T_{e,SF,out}),$$

where $T_{SF,AVG}$ is the average particulate filter temperature, $r_3$ is the position where the maximum temperature occurs, $T_{e,SF,in}$ is the temperature of the exhaust at the inlet of the particulate filter, and $T_{e,SF,out}$ is the temperature of the exhaust at the outlet of the particulate filter.

In a further embodiment, the average temperature module is configured to calculate the average bed temperature according to $T_{SF}=a_0 T_{e,SF,in}+(1-a_0)T_{e,SF,out}+a_1(T_{e,SF,in}-T_{e,DOC,in})$, where $T_{e,SF,in}$ is the temperature of the exhaust at the inlet of the particulate filter, $T_{e,SF,out}$ is the temperature of the exhaust at the outlet of the particulate filter, $T_{e,DOC,in}$ is the temperature of the exhaust at the inlet of an oxidized catalyst, and $a_0$ and $a_1$ are calibratable factors.

The calibratable factors may be selected from a group comprising temperature at the inlet, temperature at the outlet, slope of the temperature profile at the inlet, slope of the temperature profile at the outlet, the integral of the max temperature equation, mass flow of exhaust, and mass flow of fuel. The apparatus may also include a timer module configured to maintain a start time of a next scheduled particulate filter regeneration.

A system of the present invention is also presented. The system includes a vehicle having a motor, an exhaust system, an after treatment system, an after treatment controller module, and the apparatus.

A method of the present invention is also presented, and includes determining an average bed temperature, and calculating a target maximum bed temperature based upon the average bed temperature. The method may include adjusting the average temperature of the bed to a range of between about ±200° F. of the target maximum bed temperature in order to initiate regeneration of the particulate filter.

In one embodiment, the method also includes calculating the target maximum bed temperature according to $$T_{3,max,SF} = T_{SF,AVG} + \left[\frac{7}{80r_3} + \frac{3}{8}r_3 - \frac{1}{16}r_3^3\right](T_{e,SF,in} - T_{e,SF,out}),$$

where $T_{SF,AVG}$ is the average particulate filter temperature, $r_3$ is the position where the maximum temperature occurs, $T_{e,SF,in}$ is the temperature of the exhaust at the inlet of the particulate filter, and $T_{e,SF,out}$ is the temperature of the exhaust at the outlet of the particulate filter.

In a further embodiment, the calculating the average bed temperature comprises calculating the average bed temperature according to $T_{SF}=a_0T_{e,SF,in}+(1-a_0)T_{e,SF,out}+a_1(T_{e,SF,in}-T_{e,DOC,in})$, where $T_{e,SF,in}$ is the temperature of the exhaust at the inlet of the particulate filter, $T_{e,SF,out}$ is the temperature of the exhaust at the outlet of the particulate filter, $T_{e,DOC,in}$ is the temperature of the exhaust at the inlet of an oxidized catalyst, and $a_0$ and $a_1$ are calibratable factors. The method may also include maintaining a start time of a next scheduled particulate filter regeneration Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
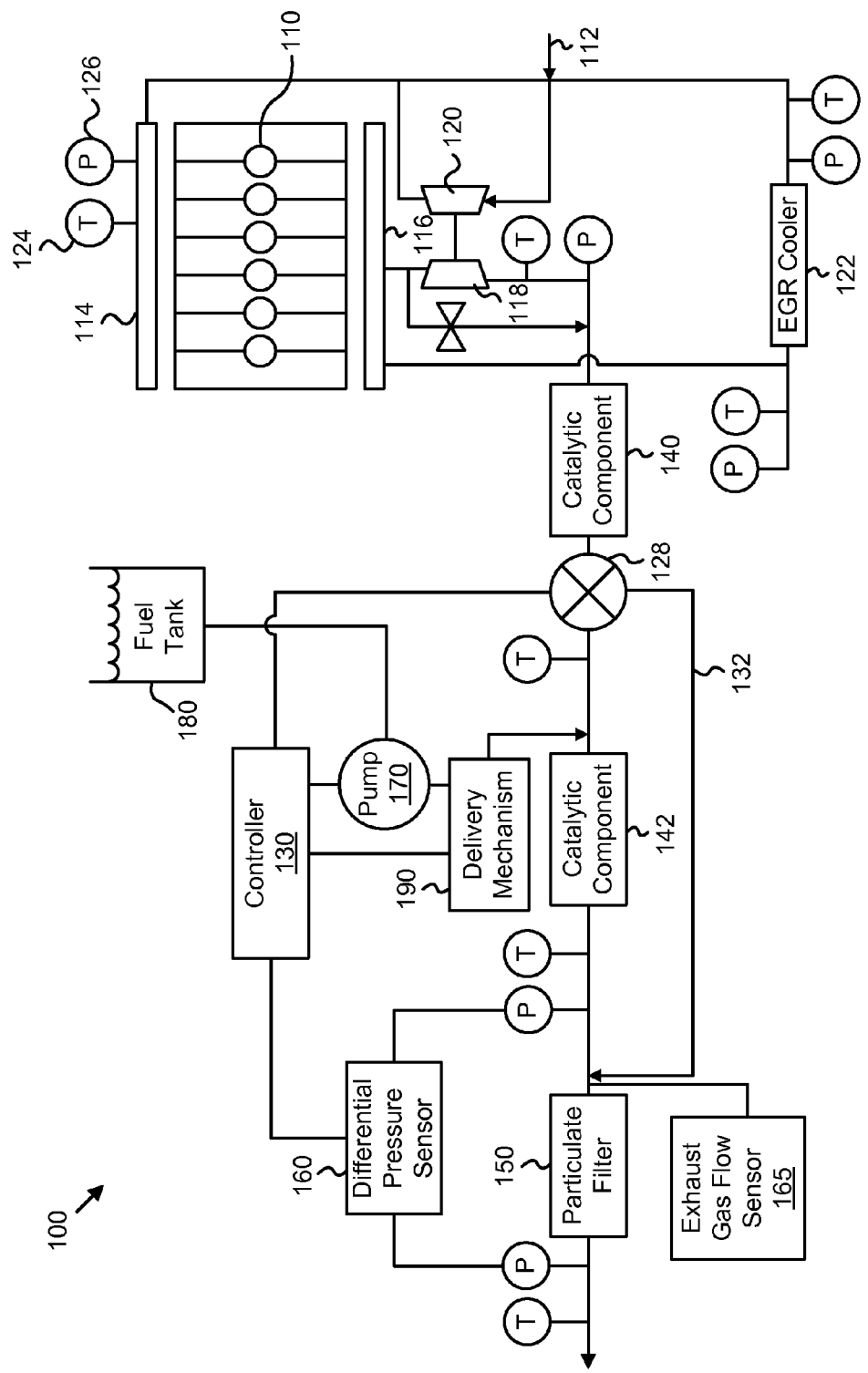
FIG. 1 depicts one embodiment of an internal combustion engine system, such as a diesel engine system, in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a computer readable medium may take any form capable of generating a signal, causing a signal to be generated, or causing execution of a program of machine-readable instructions on a digital processing apparatus. A computer readable medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 depicts one embodiment of an internal combustion engine system, such as a diesel engine system 100, in accordance with the present invention. As illustrated, the engine system 100 may include a diesel engine 110, a controller 130, a catalytic component 140 to oxidize engine-out hydrocarbons, a catalytic component 142 to oxidize added hydrocarbons, adsorb $NO_x$, or both, and a particulate filter 150 to trap soot particles from the soot generating source. The engine system 100 may further include various temperature sensors 124, various pressure sensors 126, an air intake 112, a turbine compressor 120, an air intake manifold 114, an exhaust manifold 116, an exhaust turbine 118 that may include a wastegate or variable geometry technology, an exhaust gas recirculation with a cooler 122, an exhaust bypass valve 128, exhaust bypass line 132, a fuel tank 180 which supplies the engine 110 and potentially an external fueling pump 170, an external fueling delivery mechanism 190, an exhaust gas flow sensor 165, and a sensor 160 detecting the differential pressure across the particulate filter 150.

It is readily understood by those in the art that many of the components may not be present in a given system, and that many of the sensors may be virtual calculations based on other parameters rather than a physical device on the system. Further, it is readily understood by those in the art that alternative locations for many of the components are equivalent to the illustrations for one embodiment shown in the engine system 100, and all of these are intended to be included in the scope of the present invention.

Figure 2:
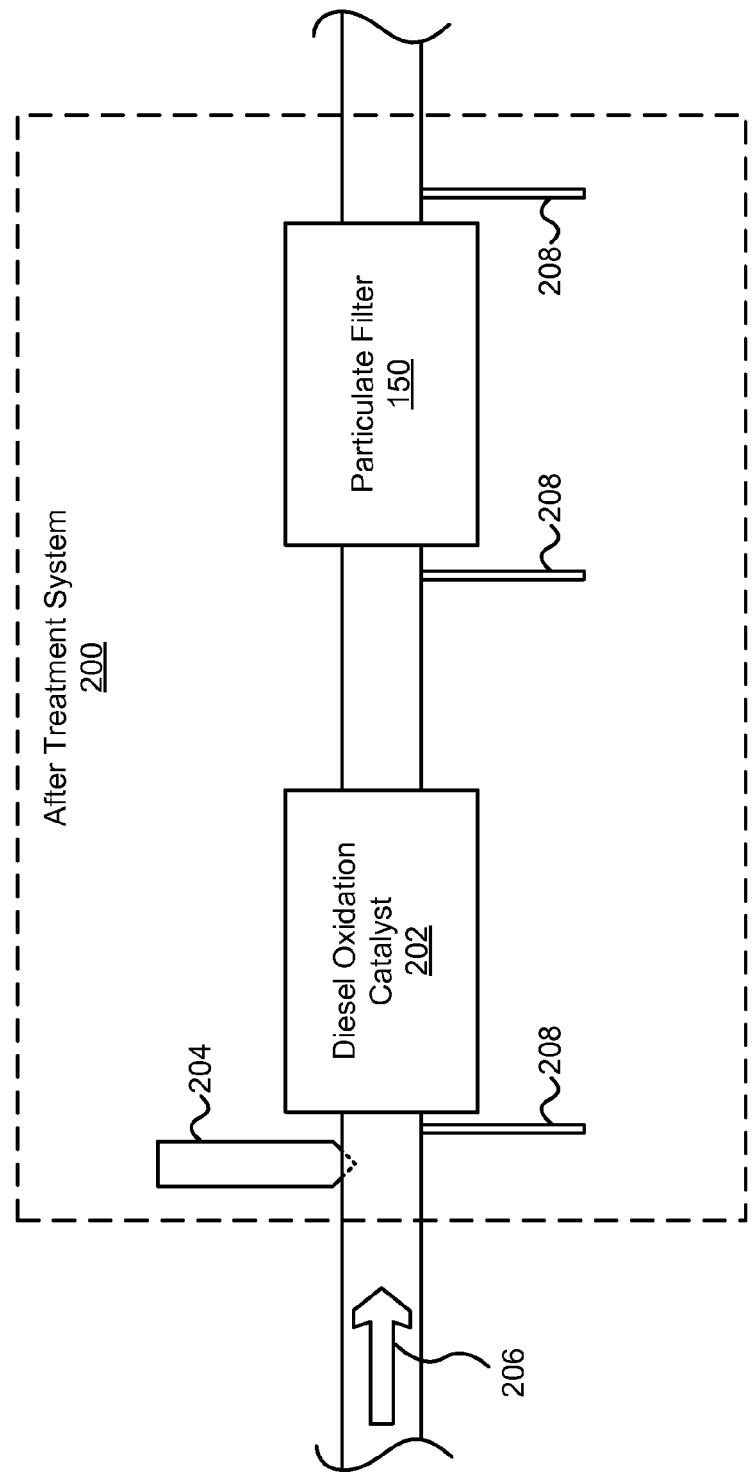
FIG. 2 is a schematic block diagram illustrating one embodiment of an after treatment system in accordance with the present invention.

FIG. 2 is a schematic block diagram illustrating one embodiment of an after treatment system 200 in accordance with the present invention. In one embodiment, the after treatment system 200 comprises the catalytic component and the particulate filter 150. In one embodiment, the catalytic component comprises a Diesel Oxidation Catalyst (DOC) 202. Although described as a Diesel Oxidation Catalyst, the present invention functions in an equivalent manner with all internal combustion engines.

In a further embodiment, the after treatment system 200 includes a dosing controller 204 configured to inject and ignite fuel into the exhaust stream in order to raise the temperature of the exhaust. The raised temperature of the exhaust serves to burn off soot that collects in the particulate filter 150. This process may be referred to as soot or particulate filter regeneration. Alternatively, the dosing fuel may be implemented using "in-cylinder" dosing where fuel is injected into a cylinder of the motor such that the fuel does not burn. Unburned fuel then flows through exhaust where it may be ignited by the DOC 202.

Exhaust flows from the engine in a direction indicated by arrow 206 through the DOC 202 and into the particulate filter 150. Temperatures of up to 1200 or 1500 degrees Fahrenheit may be required to burn off the soot and regenerate the particulate filter 150. However, raising the exhaust past a maximum filter temperature can cause damage to the particulate filter including cracking or damaging the catalytic coating of the particulate filter 150. The after treatment system 200 also includes a plurality of thermistors 208 configured to monitor the temperature of the exhaust flow. The thermistors 208 may be placed at the inlet of the DOC 202, and the inlet and outlet of the particulate filter 150.

Figure 3:
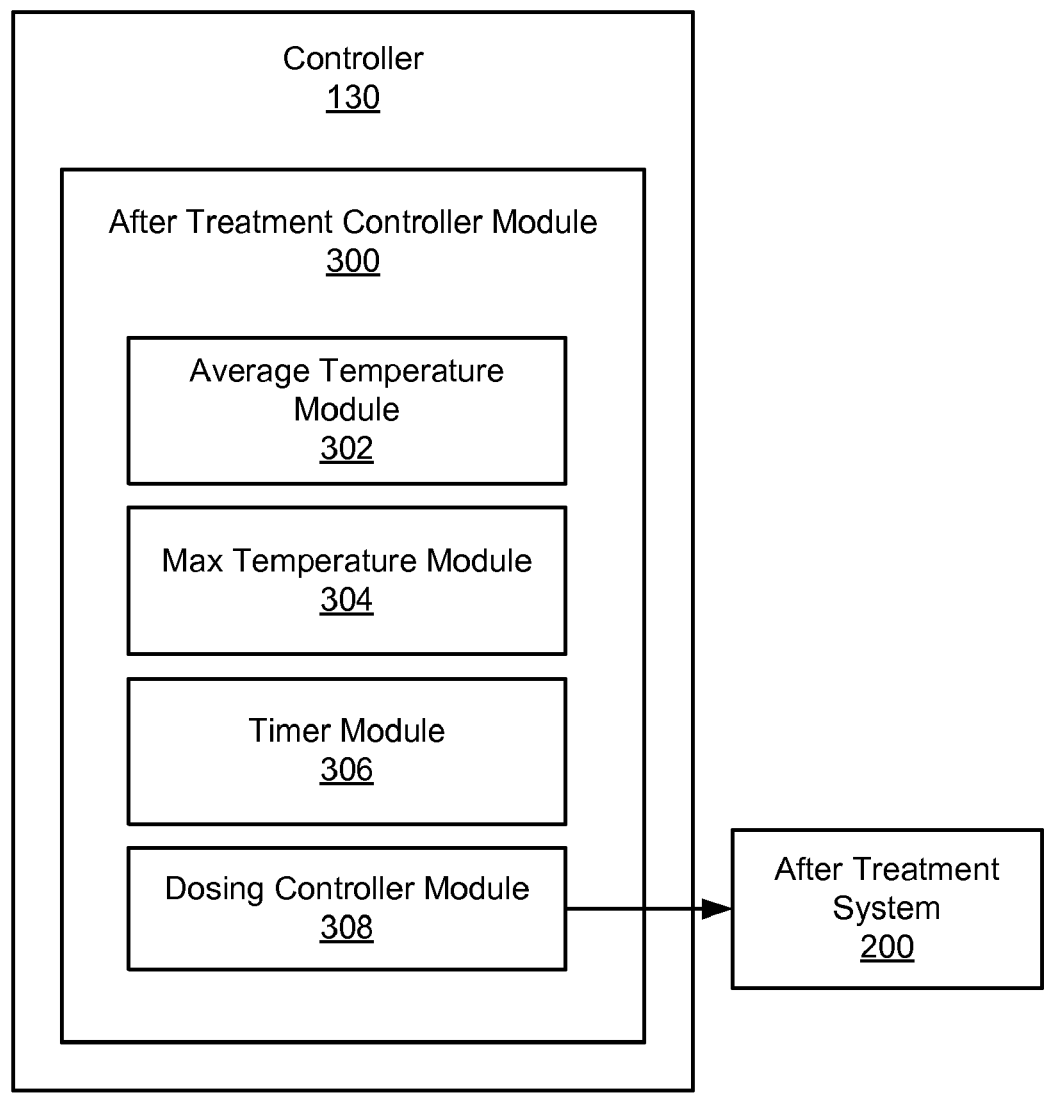
FIG. 3 is a schematic block diagram illustrating one embodiment of the controller 130 in accordance with the present invention.

FIG. 3 is a schematic block diagram illustrating one embodiment of the controller 130 in accordance with the present invention. The controller 130, in one embodiment, is commonly known as an Engine Control Module (ECM) and functions to monitor and control many aspects of the engine system 100. For clarity, many of the modules embodied within the ECM have been omitted, as one skilled in the art will recognize. Further discussion will be given with respect to the modules that pertain to the present invention.

In one embodiment, the controller 130 comprises an after treatment control module 300 that may be configured to monitor and control the treatment of exhaust as the exhaust exits the engine system 100. The after treatment control module 300, for example, monitors the after treatment system 200. One example of an after treatment system 200 capable of being controlled by the after treatment controller module 300 is described above with reference to FIG. 2.

As is known in the art, the controller 130 and components may comprise processor, memory, and interface modules that may be fabricated of semiconductor gates on one or more semiconductor devices mounted on circuit cards. Connections between the modules may be through semiconductor metal layers, substrate-to-substrate wiring, or circuit card traces or wires connecting the semiconductor devices, or the like.

In one embodiment, the after treatment controller module 300 comprises an average temperature module 302, a max temperature module 304, a timer module 306, and a dosing controller module 308. The average temperature module is configured to calculate the average temperature in the "bed" of the particulate filter 150. As used herein, the term "bed" refers generally to the structure of the filter including interior passages of the particulate filter 150. As one skilled in the art will recognize, particulate filters are generally formed of a honeycomb like structure in order to maximize the surface area of exposed catalyst.

In one embodiment, the average temperature module 302 calculates the average bed temperature according to equation 1 seen below:

$$T_{SF} = a_0 T_{e,SF,in} + (1-a_0) T_{e,SF,out} + a_1 (T_{e,SF,in} - T_{e,DOC,in}) \tag{1}$$

Where $T_{SF}$ represents the average temperature of the particulate or soot filter 150, $T_{e,SF,in}$ is the temperature of the exhaust at the inlet of the soot filter, $T_{e,SF,out}$ is the temperature of the exhaust at the outlet of the soot filter, and $T_{e,DOC,in}$ is the temperature of the exhaust at the inlet of the DOC 202. Calibratable coefficients $a_0$ and $a_1$ may be determined by analysis of thermistors placed throughout the after treatment system 200. In one example, the values of the coefficients may be in the range of between about 0.15 and 0.65.

Figure 5:
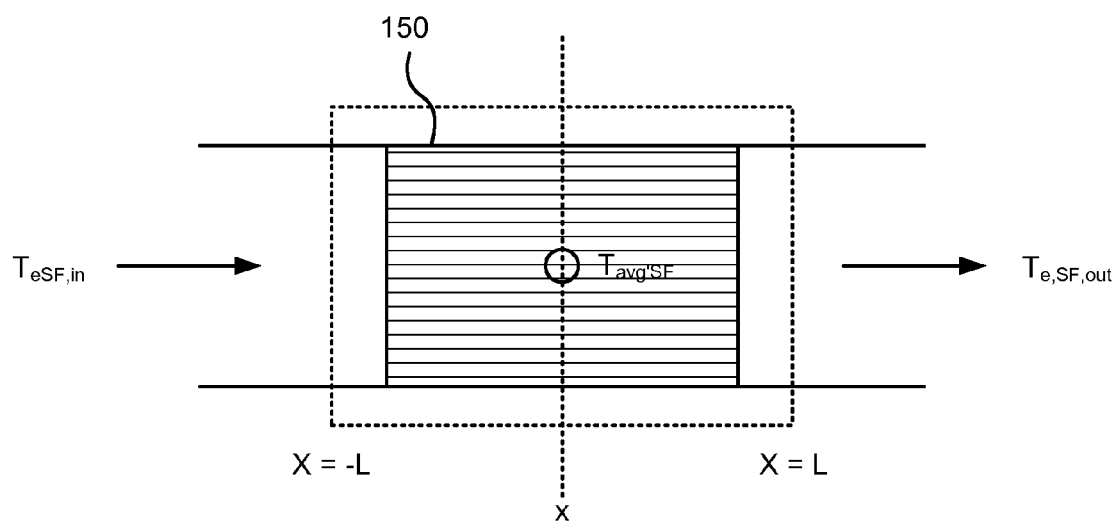
FIG. 5 is a schematic block diagram illustrating one embodiment of a particulate filter in accordance with the present invention.

The max temperature module 304 is configured to calculate the target maximum temperature for a burn off or regeneration process of the particulate or soot filter 150. In one embodiment, the max temperature module 304 calculates the target max bed temperature according to the following general equation 2:

$$T_{SF} = a_0 + a_1 x + a_2 x^2 + a_3 x^3 + a_4 x^4 \tag{2}$$

Where $a_0$, $a_1$, $a_2$, $a_3$, and $a_4$ represent coefficients and x represents the point within the soot or particulate filter where the maximum temperature occurs. For a graphical representation of x refer to FIG. 5.

In order to determine the coefficients of the general equation 2, five boundary conditions are set. In one example, the boundary conditions include the temperature of the filter at the inlet, the temperature of the filter at the outlet, the derivative of the temperature slope at the inlet, the derivative of the temperature slope at the outlet, and finally the integral of the general equation 2 is equal to the average temperature equation 1. The max temperature module 304, in one embodiment, may be configured with the following assumptions:

$$T(-L) = T_{e,SF,in} \text{ and } T(L) = T_{e,SF,out} \quad (3)$$

$$\frac{dT(-L)}{dx} = 0 \text{ and } \frac{dT(L)}{dx} = 0 \quad (4)$$

$$T_{avg,SF} = \frac{1}{2L}\int_{-L}^{L} T_{SF}\,dx \quad (5)$$

Determining the position of the maximum temperature, or x may be calculated according to the following equation:

$$x = r_3 = \frac{T_{e,SF,out} - T_{e,SF,in}}{5(2T_{avg,SF} - T_{e,SF,out} - T_{e,SF,in})} \quad (6)$$

The position then may be plugged into the following equation to determine the target maximum temperature:

$$T_{3,max,SF} = T_{SF,AVG} + \left[\frac{7}{80r_3} + \frac{3}{8}r_3 - \frac{1}{16}r_3^3\right](T_{e,SF,in} - T_{e,SF,out})$$

Of course other equations that accurately predict the target maximum temperature of the soot or particulate filter 150 may be utilized by the max temperature module 304. For example, equations utilizing the temperatures at the inlet and outlet along with the mass air flow of the exhaust and mass flow of the dosing fuel.

In a further embodiment, the timer module 306 is configured to maintain a start time of a next scheduled particulate filter regeneration. For example, the timer module 306 may comprise a simple counter that begins at 0 and counts up by 1 every second to a predetermined number. Once the predetermined number is reached, a regeneration process will begin. At this point the timer module may be configured to count down at a rate of 16 counts per second. Upon reaching zero, the regeneration process is finished. Of course, the above numbers are given by way of example only and may be modified to suit a particular engine system 100.

Alternatively, the timer module 306 may be configured to monitor the average temperature of the soot or particulate filter 150. If, during the normal course of engine operation, the temperature rises above the temperature where soot begins to burn off, the timer module 306 may begin to count down. Likewise, once the temperature drops below the temperature where soot begins to burn off the timer will again begin to count up.

The dosing controller module 308 is configured to control the dosing controller 204 which in turn raises or lowers the bed temperature of the soot filter 150. In one embodiment, the dosing controller module 308 receives a target maximum temperature from the max temperature module 304 and subsequently "doses" or injects and ignites fuel into the exhaust stream in order to raise the temperature up to the target max temperature. One skilled in the art will recognize that this function may be performed by proportional integral derivative gain controllers, simple proportional gain controllers, or the like.

Figure 4:
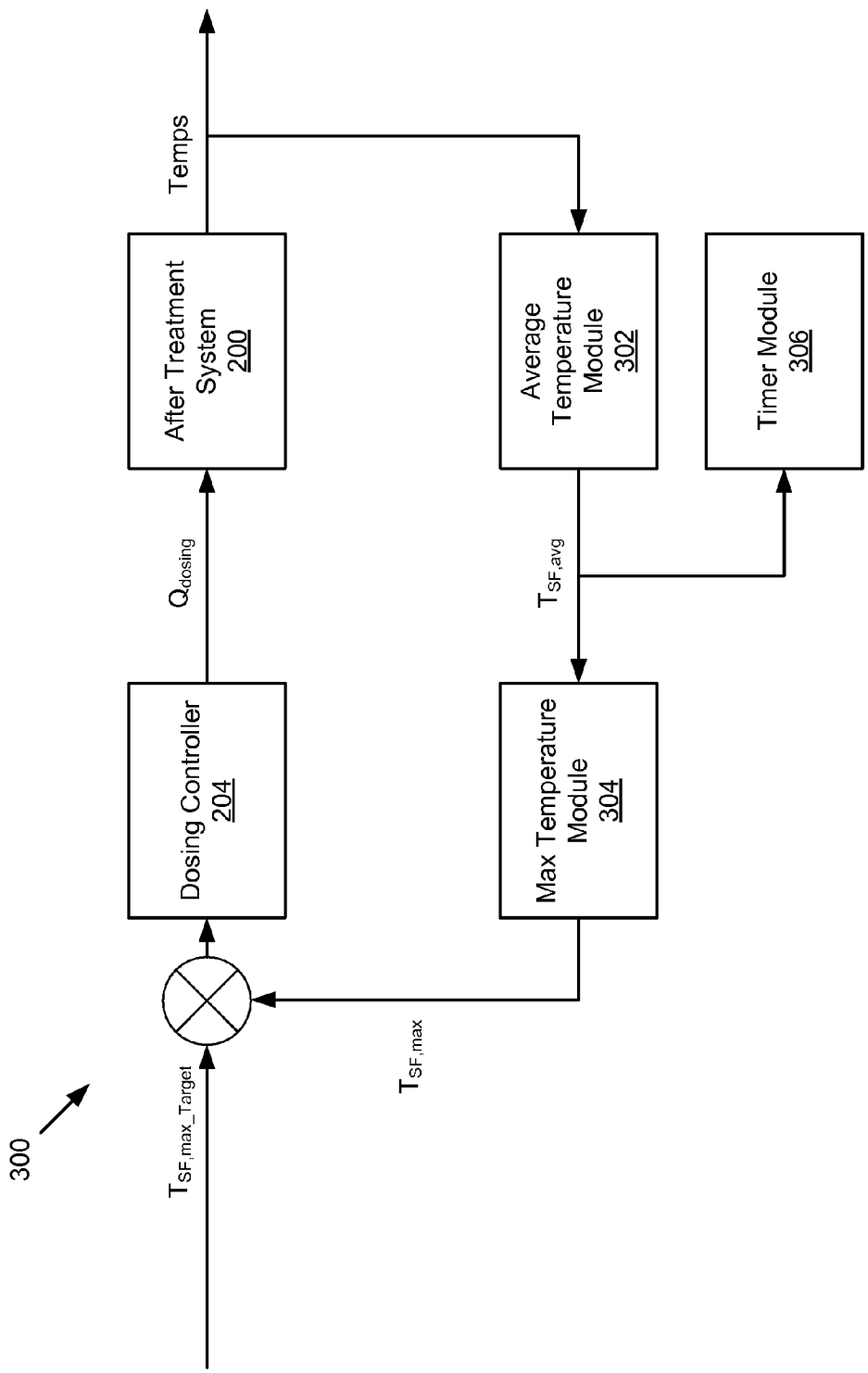
FIG. 4 is a schematic block diagram illustrating another embodiment of the after treatment controller module in accordance with the present invention

FIG. 4 is a schematic block diagram illustrating another embodiment of the after treatment controller module 300 in accordance with the present invention. FIG. 4 graphically illustrates the flow of information between the various components of the after treatment controller module 300 and the after treatment control system 200. During engine operation, the dosing controller 204 heats the exhaust stream, illustrated as $Q_{dosing}$ and the temperatures at the inlet and outlet of the particulate or soot filter 150 are measured by the after treatment controller module 300.

The temperature values are passed to the average temperature module 302 which calculates the average temperature, $T_{SF,avg}$. The average temperature module 302 passes the average temperature to the max temperature module 304 which is now able to calculate a target max temperature. The max temperature module passes the target max temperature, $T_{SF,max}$, to the dosing controller. This process will be described in greater detail below with reference to FIG. 6.

The schematic flow chart diagram that follows is set forth as a logical flow chart diagram. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 6:
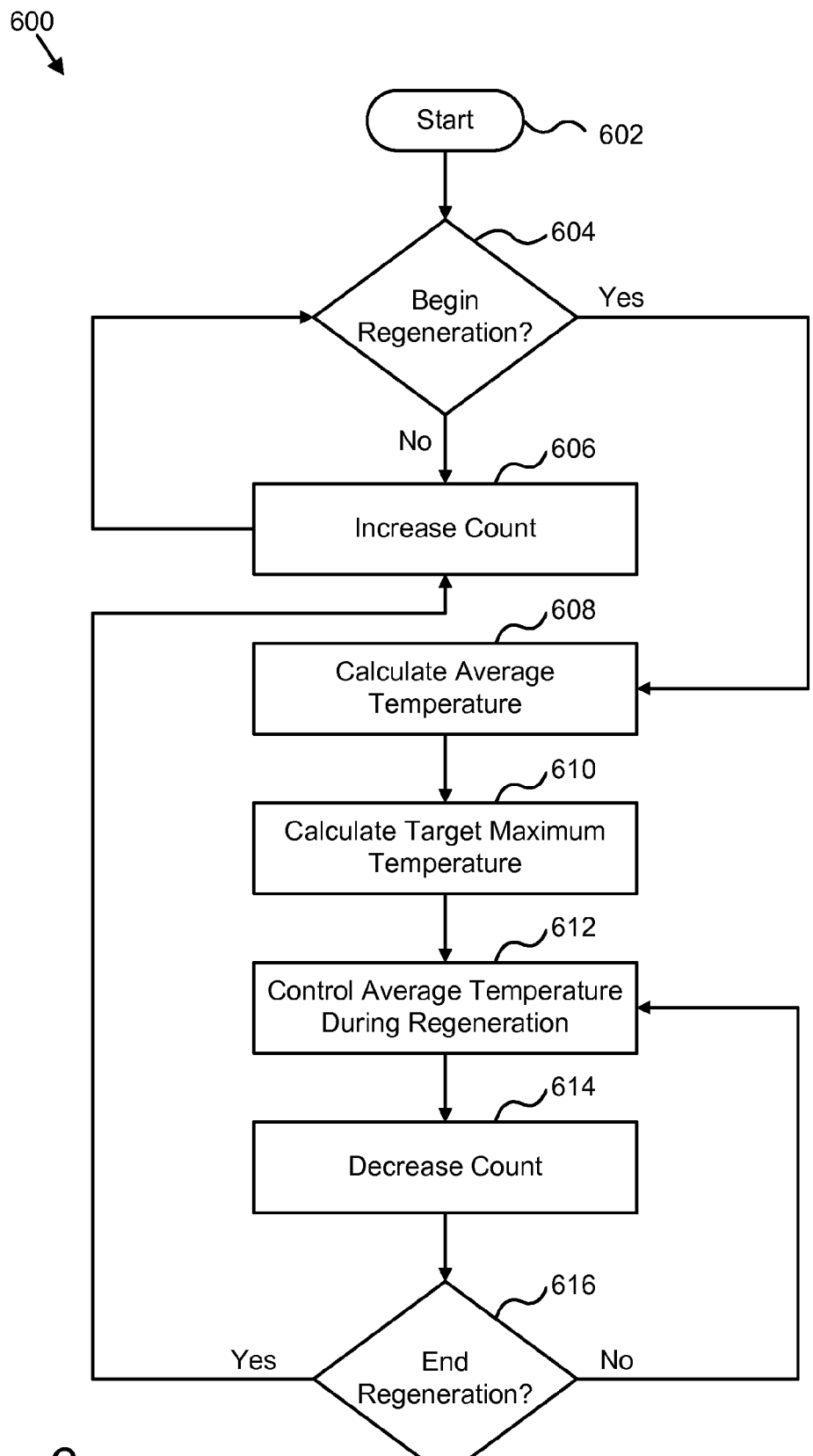
FIG. 6 is a schematic flow chart diagram illustrating one embodiment of a method for controlling soot filter regeneration using the maximum soot filter temperature in accordance with the present invention.

FIG. 6 is a schematic flow chart diagram illustrating one embodiment of a method for controlling soot filter regeneration using the maximum soot filter temperature in accordance with the present invention. The method 600 starts 602 and the after treatment controller module 300 decides whether to begin 604 regeneration. The decision may be determined in response to a counter being maintained by the timer module 306 reaching a predetermined number. If the decision is "no," the timer module 306 increases 606 the count. If the after treatment controller module 300 decides to begin 604 regeneration, the average temperature module 302 calculates 608 the average temperature of the soot filter 150 bed. The calculation may be performed as described above with reference to FIG. 3.

The average temperature module 302 passes the average temperature to the max temperature module 304 which uses the average temperature to calculate 610 the target maximum temperature. The max temperature module 304 may calculate 610 the target max temperature as described above with reference to FIG. 3. The max temperature module 304 then communicates with the dosing controller module 308 so that the dosing controller module 308 can control 612 or adjust the average temperature to a range near the target max temperature. In one embodiment, the temperature is in the range of between about ±200° C. Alternatively, the dosing controller module 308 raises the temperature to a range of between about ±100° F. of the target max temperature.

During the regeneration process, the timer module 306 decreases 614 the count that is maintained by the timer module 306. Once the counter is reduced to a predetermined number, for example 0, the after treatment control module 300 ends 616 the regeneration and the timer module 306 begins to increase 606 the count. If the regeneration is not finished, the dosing controller module 308 continues to monitor the dosing controller 204 and adjust the temperature up or down accordingly, and in order to stay within the above described range. The method 600 ends when the engine system 100 is turned off. In one embodiment, the count maintained by the timer module 306 persists and is resumed once the engine system 100 is started again.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for controlling the maximum bed temperature in a particulate filter, the apparatus comprising:
    an average temperature module configured to determine an average bed temperature of the particulate filter; and
    a max temperature module configured to calculate a target maximum bed temperature of the particulate filter based upon the average bed temperature;
    wherein the max temperature module calculates the target maximum bed temperature based on a temperature of the particulate filter at an inlet of the particulate filter, a temperature of the particulate filter at an outlet of the particulate filter, a derivative of the temperature at the particulate filter inlet, and a derivative of the temperature at the particulate filter outlet; and
    wherein the average temperature module and max temperature module each comprises at least one of logic hardware, a computer processor, and a non-transitory computer-readable storage medium storing executable code executed by a processor.

2. The apparatus of claim 1, wherein the max temperature module is further configured to calculate the target maximum bed temperature according to $$T_{3,max,SF} = T_{SF,AVG} + \left[\frac{7}{80r_3} + \frac{3}{8}r_3 - \frac{1}{16}r_3^3\right](T_{e,SF,in} - T_{e,SF,out}),$$

where $T_{SF,AVG}$ is the average particulate filter temperature, $r_3$ is the position where the maximum temperature occurs, $T_{e,SF,in}$ is the temperature of the exhaust at the inlet of the particulate filter, and $T_{e,SF,out}$ is the temperature of the exhaust at the outlet of the particulate filter.

3. The apparatus of claim 1, further comprising a timer module configured to maintain a start time of a next scheduled particulate filter regeneration.

4. The apparatus of claim 1, further comprising a temperature control module configured to adjust the average temperature of the bed to a range of between about ±200° F. of the target maximum bed temperature in order to initiate regeneration of the particulate filter.

5. The apparatus of claim 3, wherein the temperature control module is configured to adjust the average bed temperature of the particulate filter to a range of between about ±100° F. of the target maximum bed temperature in order to initiate regeneration of the particulate filter.

6. The apparatus of claim 1, wherein the average temperature module is further configured to calculate the average bed temperature according to $T_{SF}=a_O T_{e,SF,in}+(1-a_0)T_{e,SF,out}+a_1(T_{e,SF,in}-T_{e,DOC,in})$, where $T_{e,SF,in}$ is the temperature of the exhaust at the inlet of the particulate filter, $T_{e,SF,out}$ is the temperature of the exhaust at the outlet of the particulate filter, $T_{e,DOC,in}$ is the temperature of the exhaust at the inlet of an oxidized catalyst, and $a_0$ and $a_1$ are calibratable factors.

7. The apparatus of claim 6, wherein the calibratable factors are selected from a group consisting of temperature at the inlet, temperature at the outlet, slope of the temperature profile at the inlet, slope of the temperature profile at the outlet, the integral of of the max temperature equation, mass flow of exhaust, and mass flow of fuel.

8. A system for controlling the maximum bed temperature in a particulate filter, the apparatus comprising:
    a vehicle having a motor, an exhaust system, an after treatment system comprising a particulate filter, and an after treatment controller module;
    wherein the after treatment controller module comprises:
        an average temperature module configured to determine an average bed temperature;
        a max temperature module configured to calculate a target maximum bed temperature based upon the average bed temperature;
        wherein the max temperature module calculates the target maximum bed temperature based on a temperature of the particulate filter at an inlet of the particulate filter, a temperature of the particulate filter at an outlet of the particulate filter, a derivative of the temperature at the particulate filter inlet, and a derivative of the temperature at the particulate filter outlet.

9. The system of claim 8, wherein the max temperature module is further configured to calculate the target maximum bed temperature according to $$T_{3,max,SF} = T_{SF,AVG} + \left[\frac{7}{80r_3} + \frac{3}{8}r_3 - \frac{1}{16}r_3^3\right](T_{e,SF,in} - T_{e,SF,out}),$$

where $T_{SF,AVG}$ is the average particulate filter temperature, $r_3$ is the position where the maximum temperature occurs, $T_{e,SF,in}$ is the temperature of the exhaust at the inlet of the particulate filter, and $T_{e,SF,out}$ is the temperature of the exhaust at the outlet of the particulate filter.

10. The system of claim 8, wherein the average temperature module is further configured to calculate the average bed temperature according to $T_{SF}=a_O T_{e,SF,in}+(1-a_0)T_{e,SF,out}+a_1(T_{e,SF,in}-T_{e,DOC,in})$, where $T_{e,SF,in}$ is the temperature of the exhaust at the inlet of the particulate filter, $T_{e,SF,out}$ is the temperature of the exhaust at the outlet of the particulate filter, $T_{e,DOC,in}$ is the temperature of the exhaust at the inlet of an oxidized catalyst, and $a_0$ and $a_1$ are calibratable factors.

11. The system of claim 8, wherein the max temperature module is configured to calculate the target maximum bed temperature based on a mass flow rate of exhaust gas through the after treatment system and a mass flow rate of fuel entering the after treatment system.

12. The system of claim 8, further comprising a timer module configured to maintain a start time of a next scheduled particulate filter regeneration.

13. The system of claim 8, further comprising a temperature control module in communication with the after treatment system to adjust the average bed temperature of the particulate filter according to the target maximum bed temperature.

14. A method for controlling the maximum bed temperature in a particulate filter, the method comprising:
  determining an average bed temperature of the particulate filter;
  calculating a target maximum bed temperature based upon the average bed temperature; and
  adjusting the average bed temperature of the particulate filter according to the calculated target maximum bed temperature;
  wherein calculating the target maximum bed temperature is further based upon a temperature of the particulate filter at an inlet of the particulate filter, a temperature of the particulate filter at an outlet of the particulate filter, a derivative of the temperature at the particulate filter inlet, and a derivative of the temperature at the particulate filter outlet.

15. The method of claim 14, wherein adjusting the average bed temperature of the particulate filter comprises increasing a maximum temperature of the particulate bed towards the target maximum bed temperature.

16. The method of claim 14, further comprising calculating the target maximum bed temperature according to $$T_{3,max,SF} = T_{SF,AVG} + \left[\frac{7}{80r_3} + \frac{3}{8}r_3 - \frac{1}{16}r_3^3\right](T_{e,SF,in} - T_{e,SF,out}),$$

where $T_{SF,AVG}$ is the average particulate filter temperature, $r_3$ is the position where the maximum temperature occurs, $T_{e,SF,in}$ is the temperature of the exhaust at the inlet of the particulate filter, and $T_{e,SF,out}$ is the temperature of the exhaust at the outlet of the particulate filter.

17. The method of claim 14, wherein adjusting the average bed temperature of the particulate filter comprises adjusting the average bed temperature of the particulate filter to a range of between about ±200° F. of the target maximum bed bed temperature in order to initiate regeneration of the particulate filter.

18. The method of claim 14, wherein adjusting the average bed temperature of the particulate filter comprises dosing fuel into an exhaust stream upstream of the particulate filter.

19. The method of claim 14, further comprising calculating the average bed temperature according to $T_{SF}=a_0 T_{e,SF,in}+(1-a_0)T_{e,SF,out}+a_1(T_{e,SF,in}-T_{e,DOC,in})$, where $T_{e,SF,in}$ is the temperature of the exhaust at the inlet of the particulate filter, $T_{e,SF,out}$ is the temperature of the exhaust at the outlet of the particulate filter, $T_{e,DOC,in}$ is the temperature of the exhaust at the inlet of an oxidized catalyst, and $a_0$ and $a_1$ are calibratable factors.

20. The method of claim 19, wherein the calibratable factors are selected from a group consisting of temperature at the inlet, temperature at the outlet, slope of the temperature profile at the inlet, slope of the temperature profile at the outlet, the integral of the max temperature equation, mass flow of exhaust, and mass flow of fuel.

* * * * *